United States Patent [19]

Ono et al.

[11] Patent Number: 4,900,703

[45] Date of Patent: Feb. 13, 1990

[54] METHOD FOR PRODUCING CERAMICS WITH THERMAL SHOCK RESISTANCE

[75] Inventors: Yukiyoshi Ono, Hirakata; Atsushi Nishino, Neyagawa; Yasuhiro Takeuchi, Hirakata; Hironao Numoto, Katano, all of Japan

[73] Assignee: Matsushita Electric Industrial Co., Ltd., Osaka, Japan

[21] Appl. No.: 267,614

[22] Filed: Nov. 2, 1988

Related U.S. Application Data

[63] Continuation of Ser. No. 7,895, Jan. 28, 1987, abandoned.

[30] Foreign Application Priority Data

Jan. 28, 1986 [JP] Japan .................................. 61-16101

[51] Int. Cl.$^4$ ............................................. C04B 35/10
[52] U.S. Cl. .................... 501/136; 501/137; 501/153; 428/116; 264/56
[58] Field of Search .................... 501/136, 137, 153; 428/116; 264/56

[56] References Cited

U.S. PATENT DOCUMENTS

| | | | |
|---|---|---|---|
| 1,696,688 | 12/1928 | Peiler | 501/133 |
| 2,331,232 | 10/1943 | Ross | 501/136 |
| 2,776,896 | 1/1957 | Harman et al. | 501/136 |
| 4,093,468 | 6/1978 | Boitel et al. | 501/4 |
| 4,304,603 | 12/1981 | Grossman et al. | 501/136 |
| 4,307,198 | 12/1981 | Oda et al. | 501/136 |
| 4,341,872 | 7/1982 | MacDowell | 501/6 |
| 4,506,026 | 3/1985 | Hodgkins et al. | 501/136 |
| 4,542,111 | 9/1985 | Buran et al. | 501/136 |
| 4,568,652 | 2/1986 | Petty, Jr. | 501/128 |
| 4,668,646 | 5/1987 | Ando et al. | 501/136 |

FOREIGN PATENT DOCUMENTS

| | | | |
|---|---|---|---|
| 61-111962 | 5/1986 | Japan | 501/133 |
| 829447 | 6/1957 | United Kingdom | 501/4 |

OTHER PUBLICATIONS

*Glass-Ceramics and Photo-Sitalls,* A. Berezhnoi, Plenum Press, NY (1970), pp. 197-202.

Primary Examiner—Brian E. Hearn
Assistant Examiner—Andrew Griffis
Attorney, Agent, or Firm—Wenderoth, Lind & Ponack

[57] ABSTRACT

A ceramic having improved thermal shock resistance is produced by a method comprising firing a mixture comprising at least one compound selected from the group consisting of a sulfate, nitrate, carbonate, oxide, hydroxide, acetate and oxalate of an alkali metal or an alkaline earth metal, titanium oxide, rehydratable alumina, optionally silica and optionally a rare earth element compound at a temperature in the range of 1,000° C. to 1,300° C.

10 Claims, 5 Drawing Sheets

METHOD FOR PRODUCING CERAMICS WITH THERMAL SHOCK RESISTANCE

This application is a continuation of application Ser. No. 007,895, filed Jan. 28, 1987, now abandoned.

BACKGROUND OF THE INVENTION

1. Field of the Invention

The present invention relates to a method for producing ceramics having a small coefficient of thermal expansion and improved thermal shock resistance. More particularly, it relates to a method for producing ceramics having good thermal shock resistance suitable for use in making a catalyst carrier, a combustion apparatus and the like.

2. Description of the Prior Arts

Conventional ceramics having a small coefficient of thermal expansion and good thermal shock resistance include cordierite ceramics, lithia type ceramics, aluminum titanate ceramics and the like. The cordierite ceramics are $MgO$—$Al_2O_3$—$SiO_2$ type one. The lithia type ceramics is a $Li_2O$—$Al_2O_3$—$SiO_2$ type. The cordierite type ceramics are prepared by mixing talc $[Mg_3(Si_4O_{10})(OH)_2]$, kaolin $[Al_2Si_2O_5(OH)_4]$ and alumina ($Al_2O_3$) in an adequate ratio, followed by dehydration, molding, drying and calcining. For example, calcination of the mixture is carried out at about 1,400° C. for 4 to 5 days (cf. Japanese Patent Publication Nos. 1564/1979 and 20358/1976). The aluminum titanate ceramics is prepared by calcining a mixture of titanium oxide (anatase type) and highly pure α-alumina in an equimolar amount at 1,600° C. to 1,700° C. (cf. "Yogyokogaku Handbook" (Ceramic Industry Handbook), p 1274, Gihodo, Japan).

However, the conventional thermal shock resistant ceramics have sufficient mechanical strength only when they are calcined at a high temperature for a long period of time. In addition, the synthesized ceramics may not be dense or may tend to be cracked at particle boundaries. Therefore, they lack dimensional accuracy and their thermal shock resistance is not satisfactory.

SUMMARY OF THE INVENTION

One object of the present invention is to provide a method for producing a ceramics having improved thermal shock resistance even at a comparatively high temperature.

Another object of the present invention is too provide a method for producing a ceramics having dimensional accuracy.

Further object of the present invention is to provide a method for producing a ceramics having good mechanical strength, for example, compressive strength.

These and other objects of the present invention are accomplished by a method for producing a ceramics comprising firing a mixture comprising at least one compound selected from the group consisting of sulfate, nitrate, carbonate, oxide, hydroxide, acetate and oxalate of an alkali metal or an alkaline earth metal (hereinafter referred to as "metal compound"), titanium oxide and rehydratable alumina at a temperature in the range of 1,000° C. to 1,300° C.

DETAILED DESCRIPTION OF THE INVENTION

Figure 1:
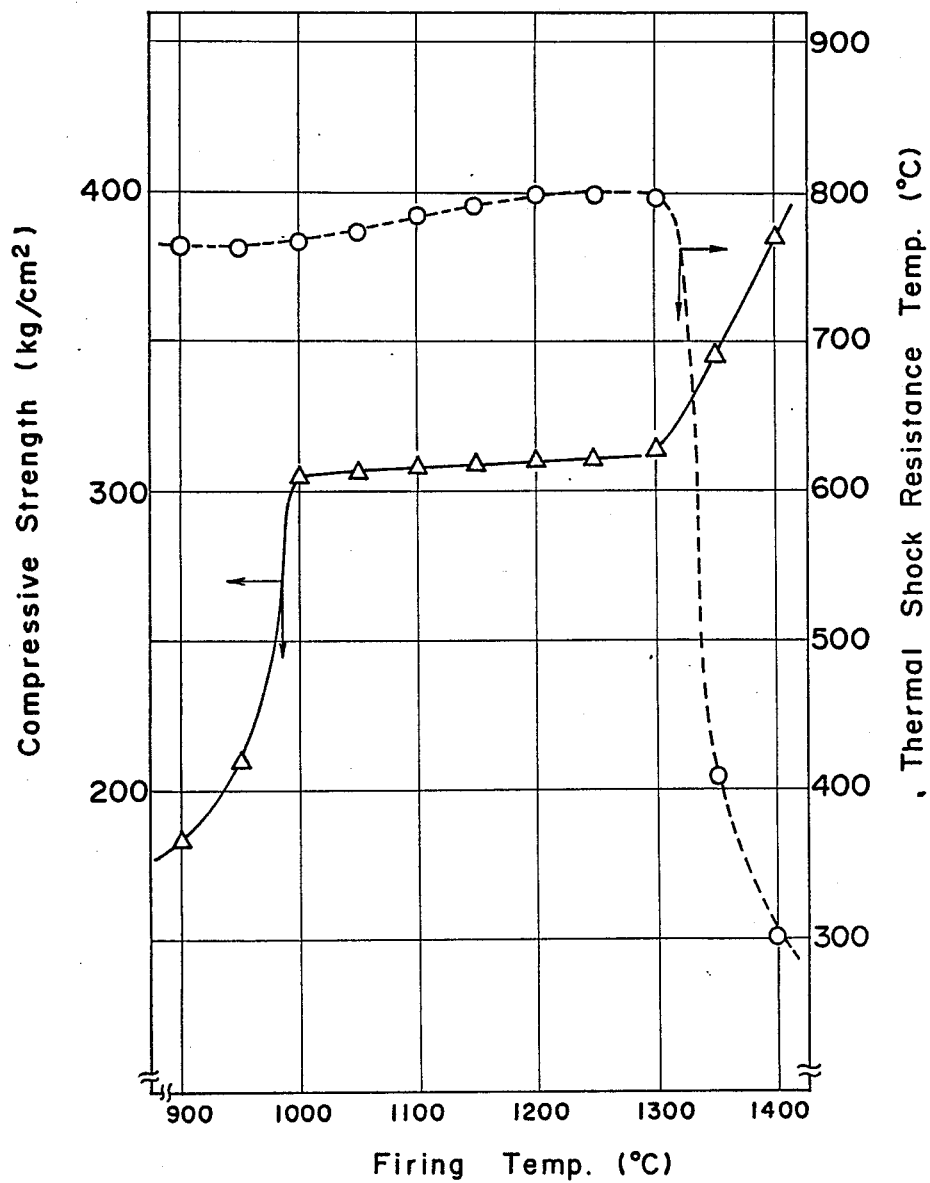
FIG. 1 is a graph showing compressive strength and thermal shock resistance temperature of the ceramics against firing temperature.

Examples of the alkali metals and alkaline earth metals employed herein are lithium, sodium, potassium, rubidium, cesium, magnesium, calcium, strontium, and barium, and they are preferably employed as sulfates, nitrates, carbonates, oxides, hydroxides, acetates, and oxalates are preferably used.

Titanium oxide includes the anatase type, rutile titanium dioxide and brookite. Among them, rutile titanium dioxide is preferred due to stability of the produced ceramics when used as the catalyst carrier.

In the present specification, the rehydratable alumina is used to mean transition alumina except α-alumina (e.g., ρ-alumina and amorphous alumina), which is prepared by pyronsis of hydrated alumina. Industrially, the transition alumina is obtained by heating hydrated alumina such as alumina trihydrate obtained from, for example, Bayer process at a temperature of about 400° C. to 1,200° C. for some tenths to ten seconds or by firing the hydrated alumina at a temperature of about 250° C. to 900° C. for one minute to four hours and usually has about 0.5 % to 15 % by weight of weight loss on heating.

The rehydratable alumina is used in the form of powder as well as sol, namely a dispersion in water. A combination of powder and sol of the rehydratable alumina improves the mechanical strength of the produced ceramics.

In view of the compressive strength and thermal shock resistance of the produced ceramics, preferably, a mixing ratio of the metal compound and titanium oxide is such that 0.1 to 4 gram in titanium oxide are present per gram atom of the alkali or alkaline earth metal in the metal compound. The weight ratio of titanium oxide to the rehydratable alumina is from 1:1 to 1:10.

When an additive as described below is used, the ratios among the metal compound, titanium oxide and the rehydratable alumina are within the above ranges. The total amount of the metal oxide, titanium oxide and the rehydratable alumina is preferably at least 10% by weight based on the whole weight of the ceramics in view of the compressive strength and thermal shock resistance of the ceramics. When the metal compound is used in the form of a coating on titanium oxide particles, the properties of the ceramics are further improved.

According to the present invention, a mixture comprising the metal compound, titanium oxide and the rehydratable alumina is fired to produce the ceramics having improved thermal shock resistance.

In addition to the metal compound, titanium oxide and the rehydratable alumina, the mixture may contain water-soluble cellulose derivatives such as carboxymethylcellulose and methylcellulose as a molding aid and glycerin and vaseline as a plasticizer. Further, as an aggregate, a low thermal expansion heat resistant material such as cordierite powder, mullite powder, silica powder and chamotte powder may be used. Among them, the silica powder is preferred in view of improvement of thermal shock resistance of the produced ceramics. The silica may be naturally occurring quartz, agate, quartz rock, sands as well as synthetic fused silica. Among them, fused silica is preferred in view of the improvement of thermal shock resistance of the produced ceramics.

Silica has a small coefficient of thermal expansion. Particularly, the fused silica has a coefficient of thermal expansion of $0.5 \times 10^{-6}$/deg in the range of room temperature to 1,000° C. and is one of the materials having the smallest thermal expansion. Since silica is a glass-forming oxide, when it is heated at a temperature of 1,000° C. or higher in the presence of an alkaline compound, it forms a crystalline compound such as cristobalite and tridymite whereby its coefficient of thermal expansion considerably increases, for example, to $4 \times 10^{-6}$ to $5 \times 10^{-6}$/deg. in the range of room temperature to 1,000° C. From this viewpoint, it has been believed that silica cannot be used in the production of thermal shock resistant ceramics.

When silica is combined with the metal compound, titanium oxide and the rehydratable alumina and fired at a temperature of 1,000° C. to 1,300° C. according to the present invention, a ceramics having good thermal shock resistance and a comparatively large specific surface area can be produced.

The content of silica in the ceramics is preferably from 60 to 90 % by weight in view of compressive strength and resistance to thermal cycling of the produced ceramics.

When the ceramics is used as the catalyst carrier, they may further contain a compound of a rare earth element (hereinafter referred to as "rare earth element compound").

Examples of the rare earth element compound are oxides of rare earth elements such as La, Ce, Pr, Nd and Sm and chloride, nitrate, acetate and hydroxide, which will be converted to the oxide by the thermal treatment at a temperature of 1,000° C. to 1,300° C. according to the present invention. Among the rear earth element compounds, those of La, Ce and Nd are preferred in view of the catalytic properties of the carrier.

Practically and presently preferred embodiments of the present invention will be illustrated by the following examples, in which part(s) and % are by weight unless otherwise indicated.

EXAMPLE 1 AND COMPARATIVE EXAMPLES 1-3

The rehydratable alumina (60 parts), titanium oxide (20 parts), potassium carbonate (20 parts) as the metal compound, methylcellulose (4.0 parts) as the molding aid, glycerin (2.0 parts) as the plasticizer and water (32 parts) were mixed and kneaded by a screw kneader for 10 minutes and then extruded by a screw extruder to form a cylindrical molded ceramic article of 100 mm in outer diameter and 100 mm in length having a honeycomb structure consisting of square cells each of 0.3 mm in wall thickness and 1.5 mm in side length. The article was heated to 1,200° C. at a rate of 10° C./hr. and fired at that temperature for one hour. Physical properties of the fired ceramic article are shown in Table 1.

For comparison, a fired ceramic article having the honeycomb structure was produced in the same manner as in the above but using α-alumina powder in place of the rehydratable alumina (Comparative Example 1), titanium oxide in place of potassium carbonate, namely 40 parts of titanium oxide in total (Comparative Example 2) or potassium oxide in place of titanium oxide, namely 40 part of potassium oxide in total (Comparative Example 3). Physical properties of those articles are also shown in Table 1. When a mixture of titanium oxide and potassium carbonate was used, a honeycomb structure of an molded ceramic article collapsed during firing and a usable article was not obtained.

In Table 1, compressive strength was measured in a direction of the C axis of the honeycomb structure. Thermal shock resistance temperature was measured as follows:

The fired ceramic article having a volume of one liter is heated in an electric furnace to a high temperature and suddenly cooled to an ambient temperature in the air and the maximum temperature of the electric furnace at which the article is first cracked after cooling is used as the thermal shock resistance temperature.

TABLE 1

| Example No. | Compressive strength (kg/cm²) | Thermal shock resistance temp. (°C.) |
| --- | --- | --- |
| 1 | 310 | 800 |
| Comp. 1 | 140 | 200 |
| Comp. 2 | 50 | 250 |
| Comp. 3 | 180 | 200 |

As is apparent from the results in Table 1, the ceramic articles produced in Comparative Examples 1-3 had small compressive strength and very poor thermal shock resistance.

EXAMPLES 2(1)-2(5)

In the same manner as in Example 1 but using the rehydratable alumina (30 parts), titanium oxide (15 parts), potassium carbonate (15 parts), cordierite powder (40 parts), methylcellulose (4 parts), glycerin (2 parts) and water (31 parts), a fired ceramic article having the honeycomb structure was produced (Example 2(1)).

In the same manner as in the above but using, in place of cordierite powder, mullite powder (Example 2(2)), chamotte powder (Example 2(3)), shore sand (Example 2(4)) or fused silica (Example 2(5)), a fired ceramic article having the honeycomb structure was produced.

Physical properties of the articles are shown in Table 2.

TABLE 2

| Example No. | Compressive strength (kg/cm²) | Thermal shock resistance temp. (°C.) |
| --- | --- | --- |
| 2(1) | 300 | 750 |
| 2(2) | 298 | 700 |
| 2(3) | 300 | 650 |
| 2(4) | 302 | 800 |
| 2(5) | 305 | 850 |

As is apparent from the result in Table 2, the ceramic article having the honeycomb structure can be produced even when the aggregate such as cordierite, mullite, chamotte and silica is added. Particularly when silica is used, the thermal shock resistance of the ceramics is much improved.

EXAMPLE 3

In the same manner as in Example 1 but using the rehydratable alumina (60 parts), titanium oxide (20 parts), a metal compound as shown in Table 3 (20 parts), methylcellulose (4.0 parts), glycerin (2.0 parts) and water (32 parts), a fired ceramic article having the honeycomb structure was produced. Physical properties of the article are shown in Table 3.

TABLE 3

| Metal compound | Compressive strength (kg/cm$^2$) | Thermal shock resistance temp. (°C.) |
|---|---|---|
| Lithium carbonate | 325 | 600 |
| Sodium carbonate | 305 | 500 |
| Potassium carbonate | 310 | 800 |
| Rubidium carbonate | 330 | 600 |
| Cesium carbonate | 300 | 550 |
| Calcium carbonate | 280 | 500 |
| Strontium carbonate | 285 | 550 |
| Barium carbonate | 300 | 500 |
| Potassium nitrate | 315 | 800 |
| Potassium acetate | 310 | 750 |
| Potassium oxalate | 310 | 750 |
| Potassium hydroxide | 310 | 800 |
| Magnesium carbonate | 315 | 750 |
| Magnesium sulfate | 310 | 800 |

As is apparent from the results in Table 3, the ceramics produced from the rehydratable alumina, titanium oxide and various alkali or alkaline earth metal compounds have good compressive strength and thermal shock resistance. Particularly, the potassium compound and the magnesium compound provide ceramics having excellent thermal shock resistance.

EXAMPLE 4

In the same manner as in Example 1 but varying the firing temperature in the range of 900° C. to 1,400° C., a ceramic article having the honeycomb structure was produced. The compressive strength and thermal shock resistance temperature are plotted in FIG. 1.

As is apparent from FIG. 1, the compressive strength decreased at a temperature lower than 1,000° C., and thermal shock resistance greatly decreased at a temperature higher than 1,300° C. Therefore, the preferred firing temperature is between 1,000° C. and 1,300° C.

In Example 1, the molded article shrank by a shrinkage factor of 8.3 % during firing, while the conventional ceramics shrink by a much larger shrinkage factor. For example, cordierite shrinks by 20 % or more. Therefore, it is difficult for the article made of the conventional ceramics to have good dimensional accuracy due to the large shrinkage factor. On the contrary, the article made of the ceramics according to the present invention has improved dimensional accuracy.

EXAMPLE 5

In the same manner as in Example 1 but using 40 parts of a mixture of titanium oxide and potassium carbonate with a gram atom ratio in the range of 0.06:1 to 7:1 (Ti:K), a ceramic article having the honeycomb structure was produced. The thermal shock resistance temperature is plotted in FIG. 2.

Figure 2:
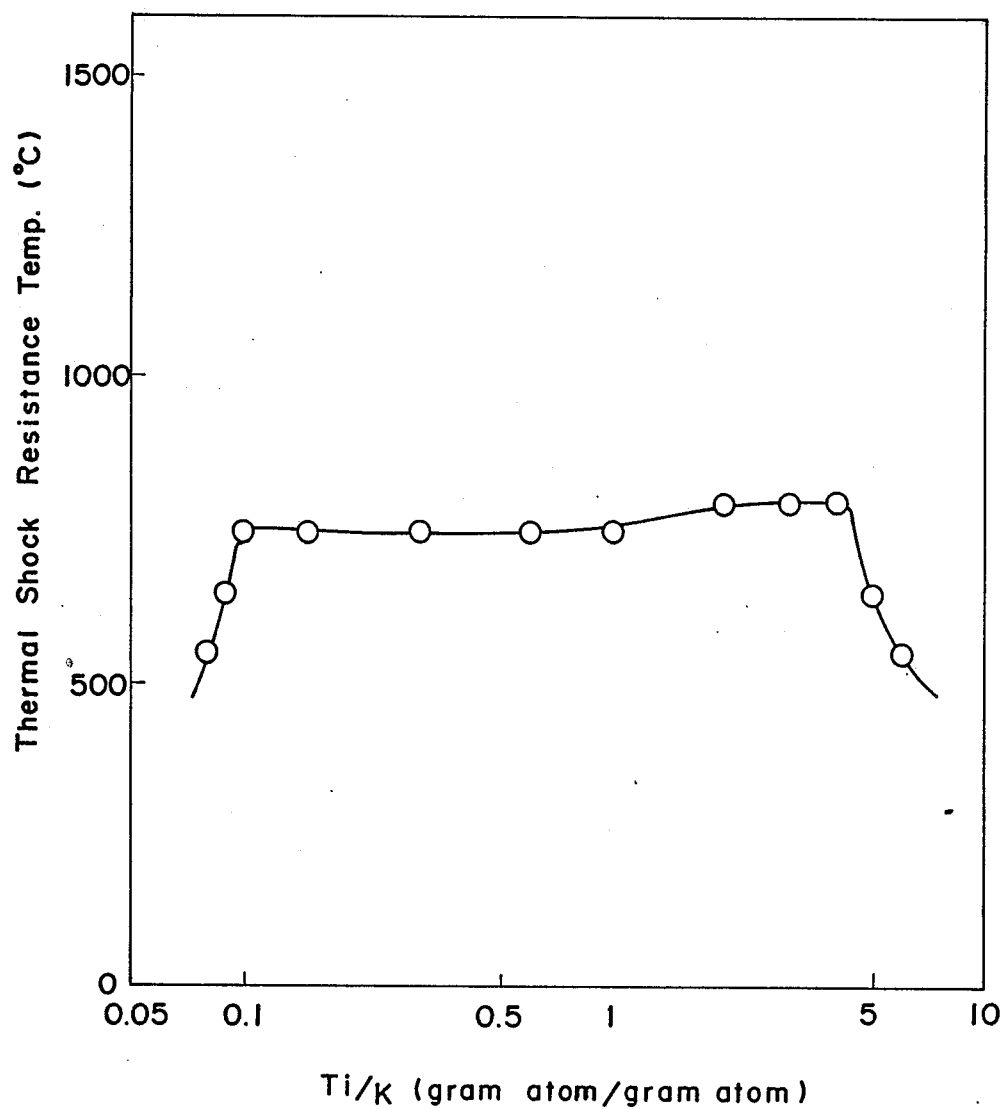
FIG. 2 is a graph showing thermal shock resistance temperature of the ceramics against the gram atom ratio of titanium to potassium.

As is apparent from FIG. 2, the atomic ratio range of 0.1:1 to 4:1 is most preferred.

For other metal compounds, substantially the same results are obtained.

EXAMPLE 6

In the same manner as in Example 1 but keeping the weight ratio of titanium oxide and potassium carbonate at 1:1 and varying a weight ratio of titanium oxide and the rehydratable alumina in the range of 1:0.4 to 1:14, a ceramic article having the honeycomb structure was produced. The thermal shock resistance temperature against the weight ratio is plotted in FIG. 3.

Figure 3:
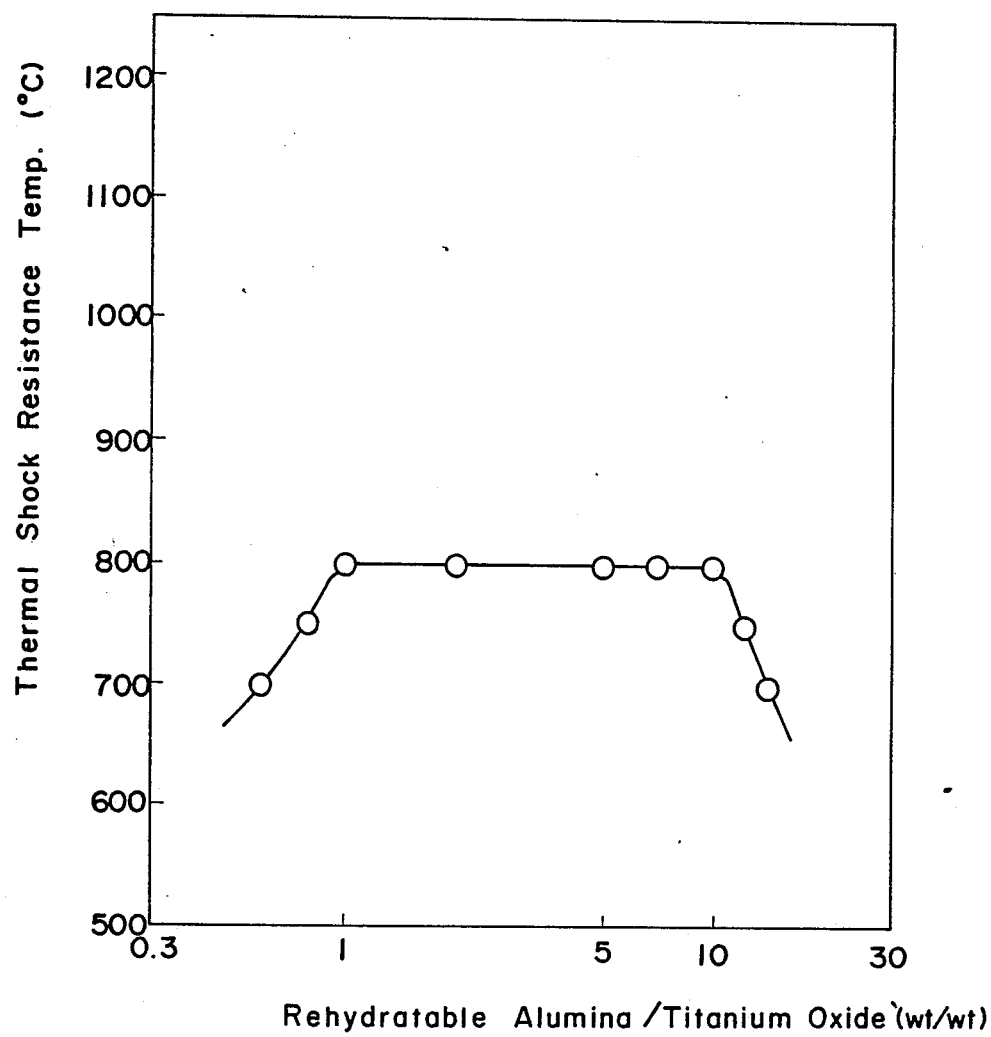
FIG. 3 is a graph showing thermal shock resistance temperature of the ceramics against the weight ratio of the rehydratable alumina to titanium oxide.

As is apparent from FIG. 3, the preferred weight ratio of titanium oxide and the rehydratable alumina is from 1:1 to 1:10.

Figure 4:
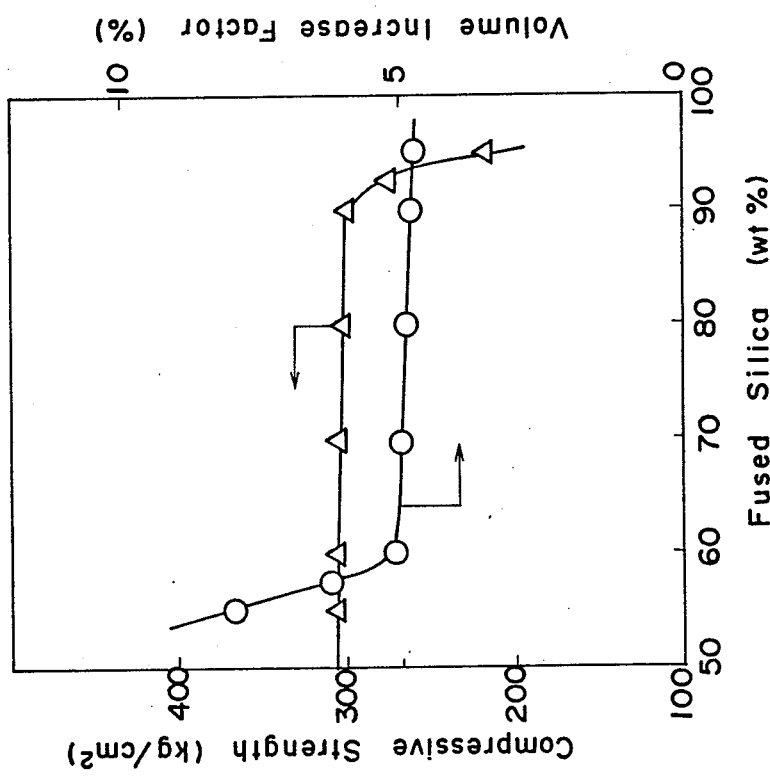
FIG. 4 is a graph showing compressive strength of the ceramics against the content of the rehydratable alumina.

Also, the compressive strength of the ceramic article against the content of the rehydratable alumina is plotted in FIG. 4.

Figure 6:
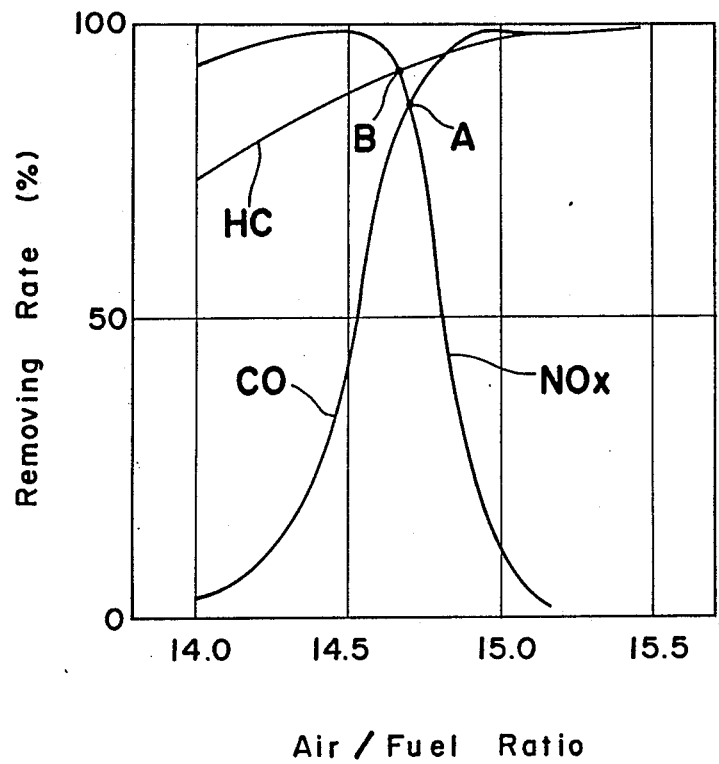
FIG. 6 is a graph showing CO, HC and $NO_x$ removing rates of the catalyst comprising a carrier made of the ceramics produced according to the present invention against the air/fuel ratio.

As is apparent from FIG. 6, the preferred content of the rehydratable alumina is 10% by weight or larger to obtain the ceramics having most preferred compressive strength.

EXAMPLE 7

In the same manner as in Example 2(2) but using the rehydratable alumina, titanium oxide and potassium carbonate in a weight ratio of 2:1:1 and varying the content of the fused silica in the range of 55 % to 95 %, a ceramic article having the honeycomb structure was produced. Compressive strength and volume increase factor after thermal cycling were measured. The volume increase factor was measured as follows:

One thermal cycling consisted of heating the ceramic article from room temperature to 1,100° C. over over one hour, keeping it at the same temperature for 15 minutes and cooling it to room temperature over 30 minutes. After repeating 500 cycles, the volume expansion factor was measured. In view of suppression of crack formation, the smaller the volume increase factor, the better.

Figure 5:
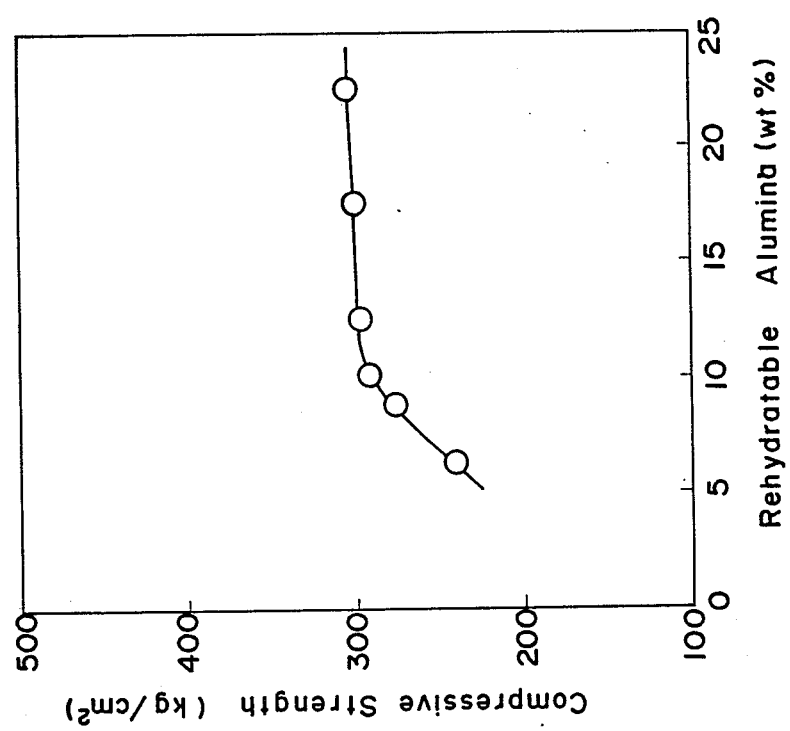
FIG. 5 is a graph showing compressive strength and the volume increase factor of the ceramics against the content of the fused silica in the ceramics.

The results are plotted in FIG. 5.

Although the compressive strength of the ceramic article did not change substantially with increase of the content of the fused silica until 90%, it suddenly fell over 90%. The volume increase factor increased below 60% of the fused silica content. From these results, a preferred content of the fused silica is between 60% and 90%.

EXAMPLES 8(1)–8(5)

In the same manner as in Example 1 but using the rehydratable alumina (10 parts), titanium oxide (5 parts), potassium carbonate (5 parts), the fused silica (75 parts), nitrate of the rare earth element (5 parts), methylcellulose (4.0 parts) as the molding aid, glycerin (2.0 parts) as the plasticizer and water, a ceramic article having the honeycomb structure was produced. The rare earth element used in each example was as follows:

Example 8(1): La
Example 8(2): Ce
Example 8(3): Pr
Example 8(4): Nd
Example 8(5): Sm A ceramic article having the same composition but containing no rare earth element compound was also produced (Example 9(6)).

By using the ceramic article having the honeycomb structure as a carrier, a catalyst was produced as follows:

In a mixed aqueous solution of chloroplatinic acid and rhodium nitrate in an adequate concentration, the ceramic article was soaked for 1 minutes at room temperature and dried followed by heating at 500° C. in an atmosphere of hydrogen containing nitrogen to produce a catalyst carrying 1.0 g of platinum and 200 mg of rhodium per liter of the ceramic carrier.

The six catalysts were used for cleaning exhaust gas from an automobile and their catalytic property was evaluated by following two methods:

(1) Before and after heating the catalyst in an electric furnace kept at 1,000° C. for 100 hours, a CO removing rate of the catalyst was measured at 200° C., the space velocity of 40,000 h r$^{-1}$ and a CO content of 600 ppm (in air) at the entrance.

(2) In an exhaust line of an automobile carrying a 2,800 cc engine, the catalyst was placed and its removing rates of CO, hydrocarbons (HC) and nitrogen oxide ($NO_x$) were measured by varying the air/fuel ratio from 14.0 to 15.5 at intervals of 0.1. The initial rates and the rates after 100 hours bench time are plotted in FIG. 6. The catalystic efficiency was evaluated from the removal rates at the point A where the $NO_x$ curve and the CO curves intersect and at the point B where the $NO_x$ curve and the HC curve intersect.

The results obtained by the method (1) are shown in Table 4 and those obtained by the method (2) are shown in Table 5.

TABLE 4

| Example No. | Before heating (%) | After heating (%) |
| --- | --- | --- |
| 8(1) | 98 | 94 |
| 8(2) | 99 | 96 |
| 8(3) | 98 | 90 |
| 8(4) | 98 | 95 |
| 8(5) | 98 | 89 |
| 8(6) | 97 | 75 |

TABLE 5

| Example No. | Initial (%) A | B | After 100 hours (%) A | B |
| --- | --- | --- | --- | --- |
| 8(1) | 87 | 93 | 85 | 90 |
| 8(2) | 88 | 94 | 85 | 91 |
| 8(3) | 87 | 90 | 79 | 85 |
| 8(4) | 87 | 92 | 83 | 90 |
| 8(5) | 86 | 93 | 77 | 83 |
| 8(6) | 86 | 90 | 65 | 76 |

As is apparent from the results in Tables 4 and 5, the properties of the ceramic article as the catalyst carrier was improved by the addition of the rare earth element compound, particularly the La, Ce or Nd compound.

In Examples, the rare earth element compound was used along although two or more rare earth element compounds may be simultaneously used. Further, the chloride, acetate, hydroxide and the like of the rare earth elements have the same effects.

EXAMPLES 9(1)–9(7)

In the same manner as in Example 1 but using the rehydratable alumina (10 parts), titanium oxide (5 parts), potassium carbonate (5 parts), fused silica (80 parts), methylcellulose (4.0 parts) and water (31 parts), a fired ceramic article having the honeycomb structure was produced (Example 9(1)).

In the same manner as in the above but using, in place of potassium carbonate, magnesium carbonate (Example 9(2)), magnesium sulfate (Example 9(3)), or other potassium compounds (Examples 9(4)–9(7)), a fired ceramic article having the honeycomb structure was produced.

The volume increase factors of the articles are shown in Table 6.

As is apparent from the results in Table 6, the potassium compounds have better volume increase factors than the magnesium compounds.

TABLE 6

| Example No. | Metal compound | Volume increase Factor (%) |
| --- | --- | --- |
| 9(1) | Potassium carbonate | 4.9 |
| 9(2) | Magnesium carbonate | 6.4 |
| 9(3) | Magnesium sulfate | 5.6 |
| 9(4) | Potassium nitrate | 5.1 |
| 9(5) | Potassium acetate | 5.0 |
| 9(6) | Potassium oxarate | 5.2 |
| 9(7) | Potassium hydroxide | 5.0 |

What is claimed is:

1. A method for producing a ceramic which comprises firing a mixture comprising at least one compound selected from the group consisting of the sulfate, nitrate, carbonate, oxide, hydroxide, acetate and oxalate of an alkali metal or an alkaline earth metal, titanium oxide and rehydratable alumina, wherein the mixing ratio of the alkali metal or alkaline earth metal compound and titanium oxide is such that 0.1 to 4 gram atoms of titanium as titanium oxide are present per gram atom of the alkali or alkaline earth metal in the metal compound, and the weight ratio of titanium oxide to the rehydratable alumina is from 1:1 to 1:10, at a temperature in the range of 1,000° C. to 1,300° C. for a time sufficient to produce said ceramic.

2. The method according to claim 1, wherein the alkali metal or alkaline earth metal compound is a potassium compound or a magnesium compound.

3. The method according to claim 1, wherein the mixture further comprises silica.

4. The method according to claim 3, wherein silica is fused silica.

5. The method according to claim 3, wherein a content of silica is 60% to 90by wt. %.

6. The method according to claim 1, wherein the mixture further comprises a compound of a rare earth element.

7. The method according to claim 6, wherein the compound of the rare earth element an oxide or a compound which is converted to an oxide by firing.

8. The method according to claim 3, wherein the mixture further comprises a compound of a rare earth element.

9. The method according to claim 8, wherein the compound of the rare earth element is an oxide or a compound which is converted to an oxide by firing.

10. A method for producing a ceramic article having a honeycomb structure which comprises molding a mixture comprising at least one compound selected from the group consisting of the sulfate, nitrate, carbonate, oxide, hydroxide, acetate and oxalate of an alkali metal or an alkaline earth metal, titanium oxide and rehydratable alumina, wherein the mixing ratio of the alkali metal or alkaline earth metal compound and titanium oxide is such that 0.1 to 4 gram atoms of titanium as titanium oxide are present per gram atom of the alkali or alkaline earth metal in the metal compound, and the weight ratio of titanium oxide to the rehydratable alumina is from 1:1 to 1:10 and then firing said mixture at a temperature in the range of 1000° C. to 1300° C. for a time sufficient to produce said ceramic article.

* * * * *